(12) United States Patent
Chung et al.

(10) Patent No.: US 6,646,976 B1
(45) Date of Patent: Nov. 11, 2003

(54) OPTICAL PICKUP APPARATUS CAPABLE OF REDUCING CROSS TALK BY ADJACENT TRACKS AND A METHOD THEREFOR

(75) Inventors: Chong-sam Chung, Seongnam (KR); Young-man Ahn, Suwon (KR); Tae-kyung Kim, Suwon (KR); Hea-jung Suh, Seongnam (KR); Seung-tae Jung, Seongnam (KR); Chul-woo Lee, Seongnam (KR); In-sik Park, Suwon (KR); Dong-ho Shin, Seongnam (KR)

(73) Assignee: Samsung Electronics Co., Ltd.., Suwon (KR)

( * ) Notice: Subject to any disclaimer, the term of this patent is extended or adjusted under 35 U.S.C. 154(b) by 0 days.

(21) Appl. No.: 09/461,290

(22) Filed: Dec. 15, 1999

Related U.S. Application Data
(60) Provisional application No. 60/123,032, filed on Mar. 4, 1999.

(30) Foreign Application Priority Data
Feb. 12, 1999 (KR) ............................................ 1999-4982

(51) Int. Cl.[7] .................................................. G11B 7/00
(52) U.S. Cl. ................................................. 369/124.12
(58) Field of Search ........................... 369/44.23, 44.29, 369/44.35, 44.41, 44.42, 112.28, 112.04, 112.11, 112.12, 110.03

(56) References Cited
U.S. PATENT DOCUMENTS
4,862,446 A  * 8/1989 Maeda .................. 369/112.28
5,694,385 A  * 12/1997 Takahashi et al. ....... 369/44.23
6,198,711 B1 * 3/2001 Fujita et al. ............. 369/59.16

FOREIGN PATENT DOCUMENTS
| | | |
|---|---|---|
| JP | 60-138748 | 7/1985 |
| JP | 3-192540 | 8/1991 |
| JP | 4-90129 | 3/1992 |
| JP | 5-36083 | 2/1993 |
| JP | 5-242512 | 9/1993 |
| JP | 7-121901 | 5/1995 |
| JP | 8-221806 | 8/1996 |
| JP | 9-282679 | 10/1997 |
| JP | 10-198980 | 7/1998 |
| JP | 10-241194 | 9/1998 |

* cited by examiner

*Primary Examiner*—Thang V. Tran
(74) *Attorney, Agent, or Firm*—Staas & Halsey LLP

(57) ABSTRACT

An optical pickup apparatus which reduces cross talk by adjacent tracks. The optical pickup apparatus divides light reflected from an optical recording medium as a spot into center and side portions defined with respect to the radial direction of the recording medium and provides electrical signals corresponding to the reflected light in divided form. An operation unit multiplies signals corresponding to the side portions by an operation constant, adds the multiplication results and the detected signal of the center portion, and outputs an information signal of a main track with reduced cross talk by adjacent tracks in real time. The optical efficiency is sufficient that recording of an information signal can be performed with the optical pickup.

15 Claims, 8 Drawing Sheets

OPTICAL PICKUP APPARATUS CAPABLE OF REDUCING CROSS TALK BY ADJACENT TRACKS AND A METHOD THEREFOR

CROSS-REFERENCE TO RELATED APPLICATIONS

This application claims the benefit of U.S. Provisional Application No. 60/123,032, filed Mar. 4, 1999 and Korean Application No. 99-4982, filed Feb. 12, 1999, in the Korean Patent Office, the disclosures of which are incorporated herein by reference.

BACKGROUND OF THE INVENTION

1. Field of the Invention

The present invention relates to an optical pickup apparatus, and more particularly, to an optical pickup apparatus which reduces cross talk caused by adjacent tracks occurring when a high capacity recording medium having a narrow track pitch is recorded or reproduced.

2. Description of the Related Art

In order to increase the capacity of a recording medium, development is centered on using a light source of a shorter wavelength and an objective lens having a larger numerical aperture when recording/reproducing the recording medium. That is, as an optical recording medium, a compact disk (CD) which uses an infrared light source of a wavelength of 780 nm and an objective lens having a numerical aperture of 0.45 is replaced by a digital versatile disk (DVD) which uses a light source of a wavelength of 650 nm and an objective lens having a numerical aperture of 0.6. In addition, to change specifications from the CD to the DVD and enhance the density of recording, development is centered to reduce the track pitch of a recording medium.

However, in the case of a recording medium having a narrow track pitch, the cross talk between adjacent tracks may deteriorate the reproduction of a recorded signal.

When a recording medium is recorded/reproduced by an optical pick-up apparatus, the degree of deterioration of the signal by adjacent tracks is defined by cross talk between the tracks, and an allowable value is set according to a recording medium. For example, in order to acquire a high quality reproduced signal in the case of a DVD-ROM, the DVD is required to have a cross talk value less than −30 dB.

A DVD-ROM uses an objective lens of a numerical aperture of 0.6 and a light source of a wavelength ($\lambda$) of 650 nm, is manufactured to have a track pitch of 0.74 $\mu$m, and has a capacity of 4.7 GB. Since the size of a beam spot determining a recording capacity is proportional to $\lambda/NA$, in the above case, $\lambda/NA$ is 1.08. Therefore, the ratio of the track pitch (Tp) to the beam spot is $Tp \times NA/\lambda = 0.68$, and the cross talk between adjacent tracks has a value lower than −30 dB.

Since an HD-DVD which is expected to attract public attention as a high density recording medium in the near future requires a capacity greater than 15 GB, the ratio of the track pitch to the beam spot must be lower than 0.6, and in this case the cross talk caused by adjacent tracks increases. For example, when a HD-DVD uses a light source of a wavelength of 410 nm and an objective lens of a numerical aperture of 0.6, and the track pitch is set to 0.368 $\mu$m so as to have a capacity of 15 GB, cross talk caused by adjacent tracks has a very high value, higher than −20 dB. Therefore, in order to prevent deterioration of a reproduced signal, an optical pickup apparatus which is adapted to reduce cross talk caused by adjacent tracks is required.

Figure 1:
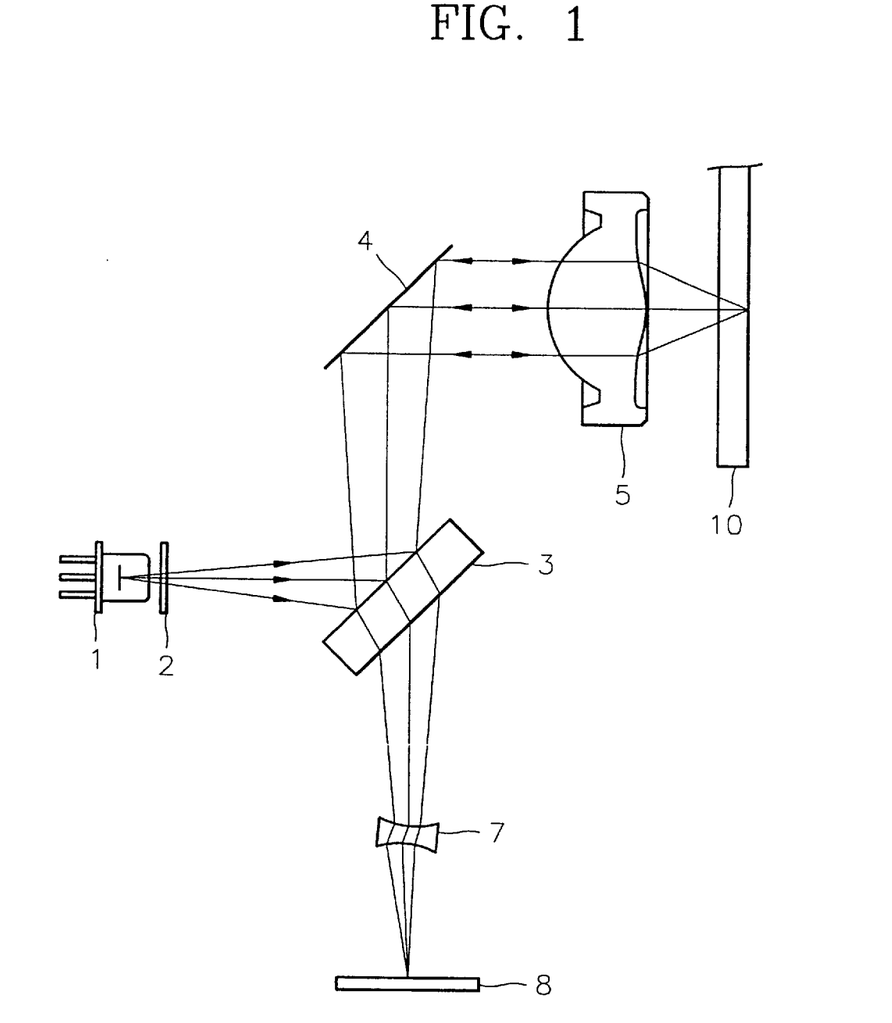
FIG. 1 is a diagram illustrating an optical layout of a conventional optical pickup apparatus capable of reducing cross talk between adjacent tracks.

FIG. 1 shows a conventional optical pickup apparatus capable of reducing cross talk between adjacent tracks.

Figure 2:
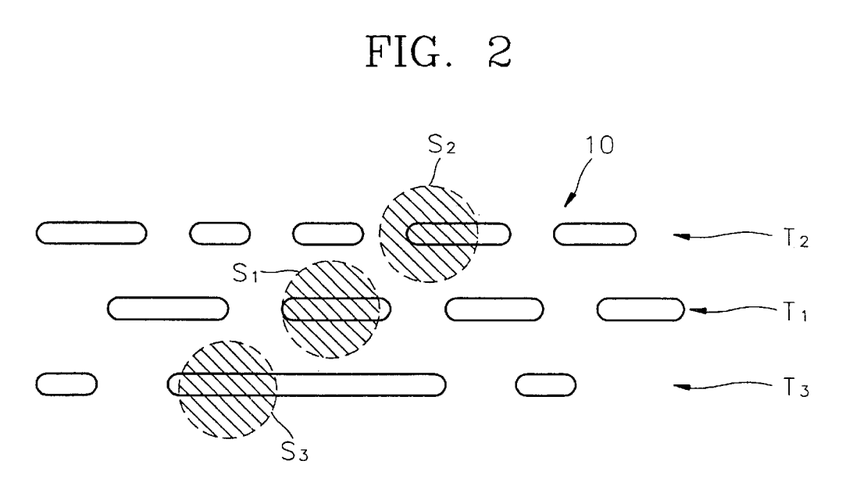
FIG. 2 is a plan view illustrating a portion of tracks of a conventional optical disk.

Referring to FIG. 1, a light emitted from a light source 1 is diffracted by a grating 2, and is separated into three light beams of a zeroth order diffracted light beam and ± first order diffracted light beams. After the beams are reflected on a beam splitter 3, the reflected beams are converged by an objective lens 5 and form three light beam spots S1, S2 and S3 at positions different from each other on an optical disk 10 as shown in FIG. 2. That is, the zeroth order diffracted light beam forms the light beam spot S1 on a main track T1 from which an information signal is reproduced, and the ± first order diffracted light beams form the light beam spots S2 and S3 on first and second adjacent tracks T2 and T3 adjacent to the main track T1, respectively.

At this time, as shown in FIG. 2, the light beam spots formed on the optical disk 10 are formed on the main track T1 and the adjacent tracks T2 and T3 to be slanted with respect to each other. That is, the light beam spot S2 formed on the first adjacent track T2 precedes the light beam spot S1 formed on the main track T1, and the light beam spot S3 formed on the second adjacent track T3 goes behind the light beam spot S1. Here, since side portions of the individual light beam spot lie over adjacent tracks due to the narrow track pitch, the zeroth order diffracted light beam and the ± first order diffracted light beams form the light beam spots not only on the corresponding tracks but also on the adjacent tracks.

Figure 3:
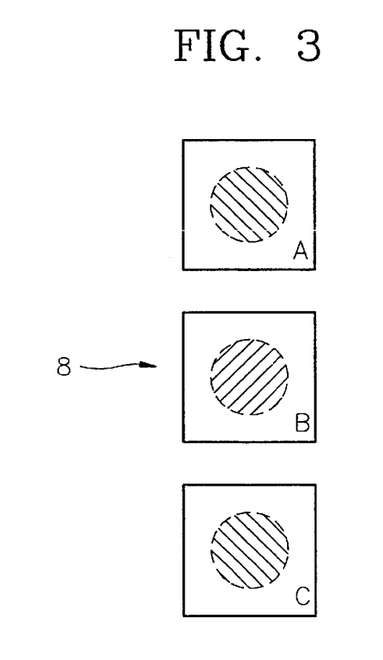
FIG. 3 is a plan view schematically illustrating the photodetector shown in FIG. 1.

The light beams which were reflected from the optical disk 10 and passed through the objective lens 5 pass through the beam splitter 3 and are detected by a photodetector 8 which is provided with first, second and third light receiving portions A, B and C performing photoelectrical conversion independently of each other. That is, the three light beams reflected from the respective tracks of the optical disk 10 are received by the respective light receiving portions, A, B and C of the photodetector 8 as shown in FIG. 3.

In FIG. 1, reference number 4 denotes a reflective mirror, and reference number 7 denotes a sensing lens which condenses incident light beams on the photodetector 8.

In the optical pickup apparatus structured as described above, an information signal to be detected is a signal which is reflected from the main track T1 and received by the second light receiving portion B. However, since portions of the light beam spot S1 by the zeroth order diffracted light beam are formed over the first and second adjacent tracks T2 and T3, the detected signal of the second light receiving portion B includes not only the signal of the main track T1 but also the signals of adjacent tracks, which are intermixed therewith. Therefore, the information signal of the main track T1 is detected by performing a differential operation on the detected signal of the second light receiving portion B and the signals of adjacent tracks detected by the first and third light receiving portions A and C. When the light receiving portion and the signal detected by the light receiving portion are expressed by the same symbol, the RF signal of the main track T1 is expressed by the following Equation (1)

$$RF\ signal = B - K \times [A+C] \qquad (1)$$

where K is a constant which is determined so that vibrations in the time axis of the information signal of the main track T1 can be minimized, i.e., a constant which is determined so that cross talk by the adjacent tracks T2 and T3 can be minimized.

On the other hand, since the three beams diverged by the grating 2 are converged on respective tracks to form the light beam spots which are slanted with respect to each other as shown in FIG. 2, the signals of the adjacent tracks which are detected by the first and third light receiving portions A and C are delayed for a constant time with respect to the signals of the adjacent tracks which are included in the signal detected by the second light receiving portion B. Therefore, it is not possible to perform a real-time operation so as to detect the information signal of the main track, and there is a problem in that signals which are delayed for the constant time with respect to the detected signal B are used as the signals A and C of the adjacent tracks.

In addition, in the above method of reducing cross talk by adjacent tracks, since three light beam spots must be formed on respective tracks of the optical disk 10, the optical efficiency of the light beam spot S1 for recording/reproducing the information signal of the main track T1 is lowered, and it is difficult to use the light beam spot S1 for recording.

SUMMARY OF THE INVENTION

To solve the above problems, it is an objective of the present invention to provide an optical pickup apparatus which detects, in real-time, an information signal of a main track in which cross talk caused by adjacent tracks is reduced, and which reduces cross talk by adjacent tracks without lowering the optical efficiency of a light beam spot.

Accordingly, to achieve the above objective, there is provided an optical pickup apparatus which reduces cross talk by adjacent tracks including: a light source for emitting a light beam; a light path changing means disposed on the optical path between the light source and a recording medium for changing the path of an incident light beam; an objective lens disposed on the optical path between the light path changing means and the recording medium for converging an incident light beam onto the recording medium; a photodetecting means dividing the incident light beam which is reflected from the recording medium and then passes through the light path changing means into a center portion and side portions with respect to the radial direction of the recording medium and receiving the incident light in the divided form; and an operation unit for operating the detected signals of the center portion and the side portions of the incident light beam from the photodetecting means and outputting an information signal of a main track reduced in cross talk by adjacent tracks.

According to one aspect of the present invention, the photodetecting means which is a photodetector comprises a main light receiving portion which receives the center portion of the incident light beam, and at least one auxiliary light receiving portion which is disposed at a side of the main light receiving portion with respect to the radial direction of the recording medium receive the side portions of the incident light beam apart from the main light receiving portion.

Preferably the main light receiving portion has a predetermined size so as to receive the center portion within a range of about 10 to 90% of the incident light beam.

According to another aspect of the present invention, the photodetecting means comprises: an optical member for directly passing the center portion of the incident light beam and for diffracting the side portions of the incident light beam at a predetermined angle, thereby separating the incident light beam into the center and side portions in a radial direction; and a plurality of photodetectors for photoelectrically converting the separated light beams into electrical signals independently of each other.

Preferably the operation unit includes: a multiplier which multiplies the detected signals of the side portions of the incident light beam by an adjusting operation constant K so that cross talk by adjacent tracks can be minimized; and an adder which adds the signal output from the multiplier and the detected signal of the main light receiving portion of the incident light beam, and outputs an information signal in which cross talk is reduced.

BRIEF DESCRIPTION OF THE DRAWINGS

The above objective and advantages of the present invention will become more apparent by describing in detail preferred embodiments thereof with reference to the attached drawings in which:

FIGS. 8A and 8B are graphs illustrating the amounts of cross talk with respect to operation constant K values when a recording medium having a track pitch of 0.368 $\mu$m and the pits shown FIG. 6 is reproduced by an optical pickup apparatus under a condition in which the wavelength of a light source is 410 nm, and the numeral aperture of an objective lens is 0.6;

DESCRIPTION OF THE PREFERRED EMBODIMENTS

Figure 4:
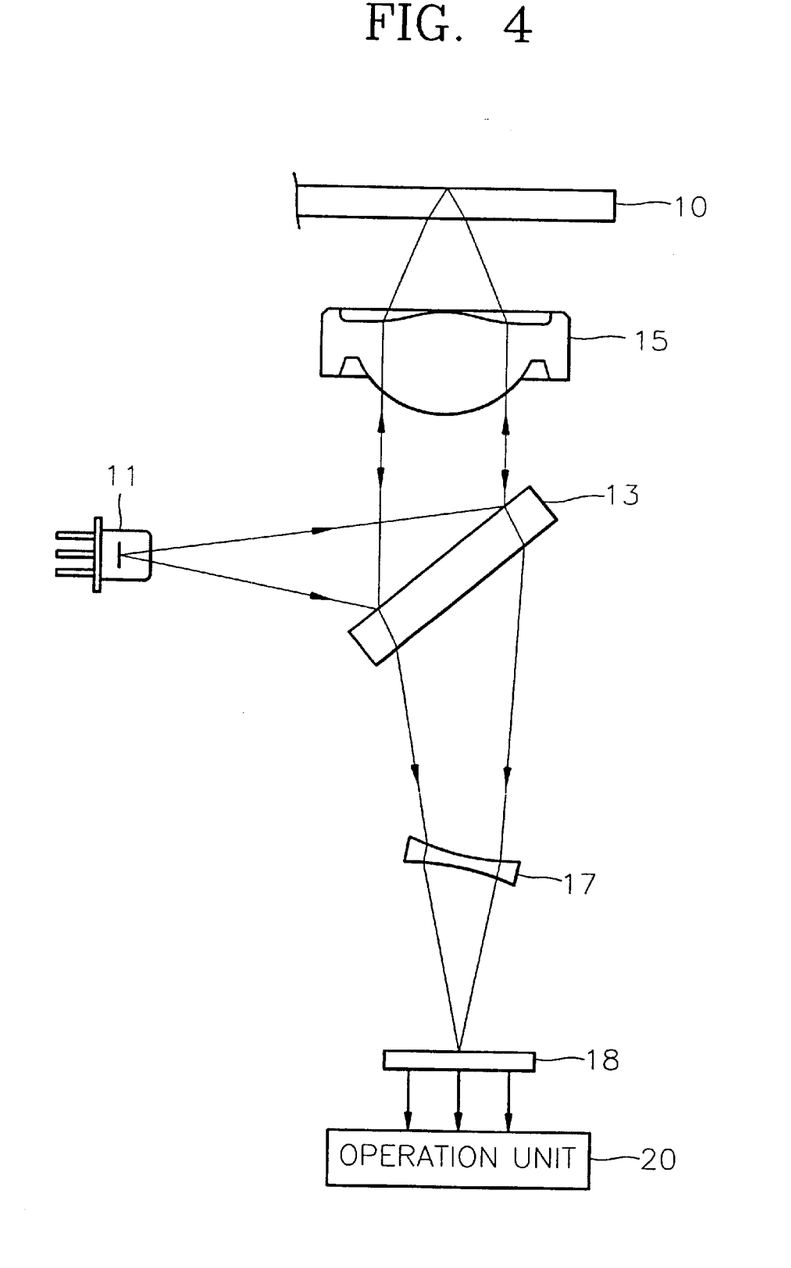
FIG. 4 is a diagram illustrating an optical layout of an optical pickup apparatus capable of reducing cross talk between adjacent tracks according to an embodiment of the present invention.

FIG. 4 is a diagram illustrating an optical layout of an optical pickup apparatus which reduces cross talk caused by adjacent tracks according to an embodiment of the present invention.

Referring to FIG. 4, an optical pickup apparatus according to the present invention comprises a light source 11 for emitting a light, a light path changer 13 disposed on the optical path between the light source 11 and a recording medium 10 for changing a path of an incident light, an objective lens 15 disposed on the optical path between the light path changer 13 and the recording medium 10 for converging an incident light onto the recording medium 10, a photodetector 18 for dividing a light beam reflected from the optical recording medium and receiving the reflected light in the divided form, and an operation unit 20 for receiving the detected signals from the photodetector 18 and outputting an information signal reduced in cross talk between adjacent tracks. Here, reference numeral 17 indicates a sensing lens.

A beam splitter may be provided as the light path changer 13. The beam splitter changes traveling paths of incident light beams so that the beam splitter can, for example, reflect most of the light beam and direct the reflected beam to the recording medium 10, and permit most of the incident beam which is reflected from the recording medium 10 to pass therethrough. Alternately a hologram element (not shown) may be provided as the light path changer 13. The hologram element directly passes the incident light from the light source 11, and diffracts the reflected light from the recording medium 10 toward the photodecter 18 at a predetermined angle. In this case, the light source 11, the hologram element and the photodetector 18 can be modularized.

The photodetector 18 divides the incident light beam which is reflected from the recording medium and then passes through the light path changer 13 into a center portion and side portions with respect to the radial direction of the recording medium 10 and receives the reflected light in the divided form.

Figure 5:
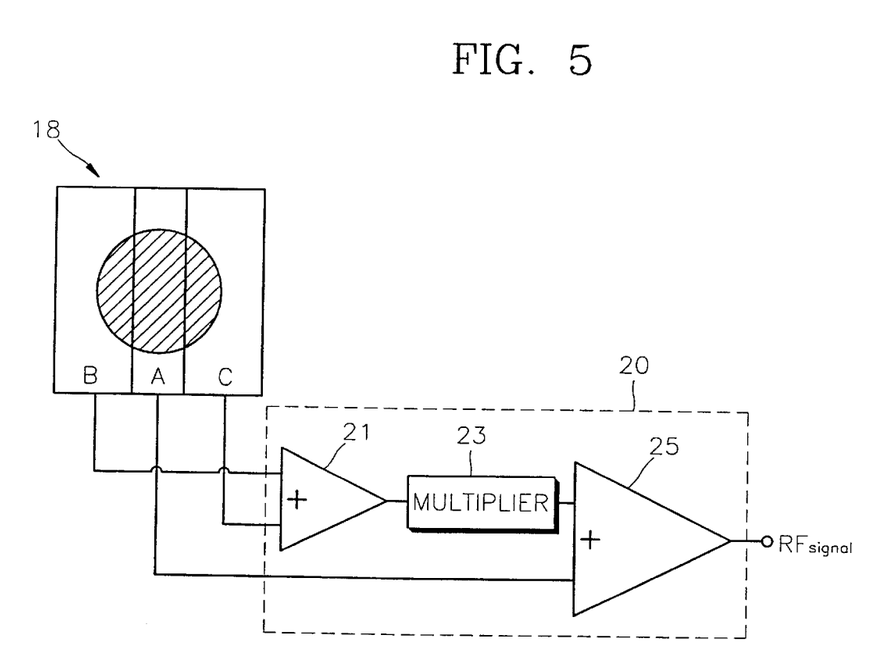
FIG. 5 is a block diagram schematically illustrating the structures of the photodetector and operation unit shown in FIG. 4.

Photodetector 18 is configured to separately receive the center portion and side portions of the incident beam as shown in FIG. 5. The photodetector 18 comprises a main light receiving portion A which receives the center portion of the incident light beam, and auxiliary light receiving portions B and C which are disposed at respective sides of the main light receiving portion A with respect to the radial of the recording medium 10 and receive the side portions of the incident light beam independently of the main light receiving portion A. Alternatively one auxiliary light receiving portion B or C may be disposed at one side of the main light receiving portion A and receive one side portion of the incident light beam.

The main light receiving portion A has a predetermined size so as to receive the center portion within the range of about 10 to 90% of the incident light beam. Here, the optimum size of the main light receiving portion A which can, as will be described below, minimize the amount of cross talk by adjacent tracks can be decided with relation to the overall layout of an optical pickup apparatus according to the present invention and a value of operation constant K to be described below, and the possible range of the size is as mentioned above.

The operation unit 20 receives a detected signal A of the center portion of the incident light beam and detected signals B and C of the side portions of the incident light beam and removes cross talk by adjacent tracks included in the signal of the main track of the recording medium 10. The operation unit 20 comprises a first adder 21 which adds signals photoelectrically converted at and output from the first and second auxiliary light receiving portions B and C, a multiplier 23 which multiplies signals (B+C) output from the first adder 21 by the operation constant K, and a second adder 25 which adds the signal A photoelectrically converted at and output from the main light receiving portion A and the signal output from the multiplier, i.e., K(B+C).

Here, the operation constant K is a constant which is decided so that cross talk by adjacent tracks included in an information signal detected through the second adder 25, i.e., vibrations in the time axis of the information signal can be minimized. According to the present invention, it is preferable that the operation constant K has a value more than about 1. Such an operation constant K value is an effective value which allows cross talk by adjacent tracks to be minimum in an optical pickup apparatus according to the present invention. The operation constant K value minimizes cross talk by adjacent tracks with respect to the main light receiving portion A having a size receiving the center portion within the range of about 10 to 90% of an incident light.

Preferably the multiplier 23 is designed to adjust the operation constant K. This is intended to set the optimum operation constant K value in response to situations at the time when an optical pickup apparatus is assembled and/or when the specifications of the recording medium 10 to be recorded/reproduced are changed, etc. At this time, the multiplier 23 may be provided to adjust the operation constant K in the range of more than about 1.

On the other hand, when the auxiliary light receiving portion (B or C) is provided at only one side of the main light receiving portion A, the operation unit according to the present invention is merely composed of the multiplier 23 and the second adder 25.

Figure 6:
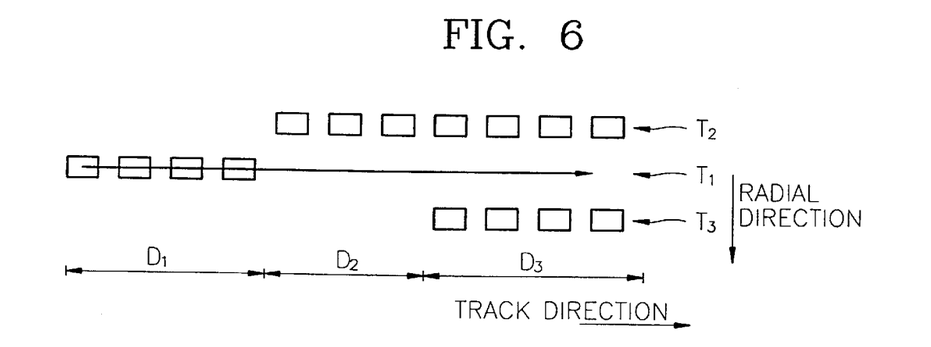
FIG. 6 is a plan view schematically illustrating an example of pits of recording medium for describing a principle of reducing cross talk by adjacent tracks in an optical pickup apparatus according to the present invention.

Now, the principle of reducing cross talk caused by adjacent tracks with the above described optical pickup apparatus according to the present invention will be described in detail with reference to an example in which pits of the recording medium 10 are as shown in FIG. 6.

Referring to FIG. 6, pits are formed along a main track T1 on a first interval D1 of the recording medium 10, other pits are formed along a first adjacent track T2 on a second interval, $D_2$ and still other pits are formed along the first adjacent track T2 on a third interval $D_3$ and a second adjacent track T3 on the third interval $D_3$. Here, when alternating components of the reproduced signal on the first and third intervals D1 and D3 are respectively X and Y, the cross talk by the adjacent tracks is defined as 20LOG(Y/X).

A light beam emitted from the light source 11 is converged by the objective lens 15 and forms a beam spot on the main track T1. At this time, the beam spot spreads over the first and second adjacent tracks T2 and T3 as well as the main track T1 due to a narrow track pitch. Therefore, the detected signal A of the main light receiving portion A and the detected sum signal B+C of the first and second auxiliary light receiving portions B and C are expressed as a graph shown in FIG. 7. Here, the horizontal axis indicates movement of the beam spot (the direction of an arrow in FIG. 6) along the track direction. In addition, the vertical axis indicates detected signal values in an arbitrary unit.

Figure 7:
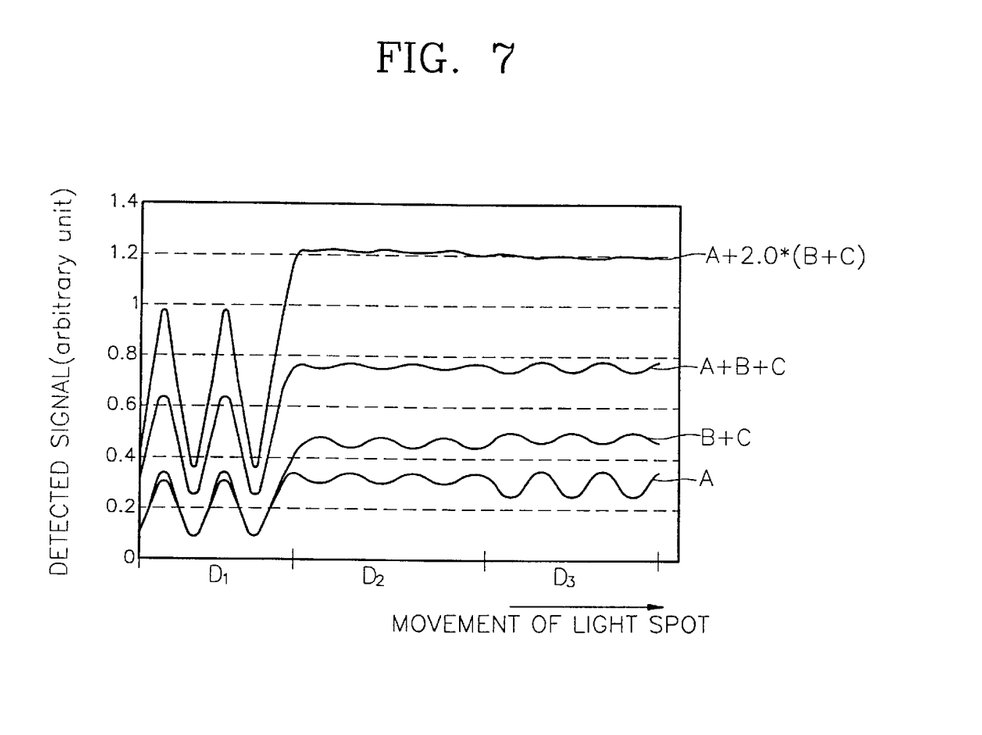
FIG. 7 is a graph schematically illustrating a detected signal when reproducing a main track of the recording medium shown in FIG. 6 by an optical pickup apparatus according to the present invention.

Referring to FIG. 7, although the detected signal A of the main light receiving portion A and the sum signal B+C of the detected signals of the auxiliary light receiving portions B and C are approximately in phase with each other on the first interval, they are about 180° out of phase with each other on the second and third intervals D2 and D3. Accordingly, the reproduced signal A+B+C which is the sum of the detected signals as they are, exhibits alternating components on the interval where pits are not formed on the main track T1, for example, the third interval D3 due to the interference of adjacent tracks T2 and T3. Therefore, cross talk by adjacent tracks becomes a high value higher than about −20 dB.

However, if the sum signal B+C of the detected signals of the auxiliary light receiving portions B and C is multiplied by the operation constant K=2.0, the compensated reproduced signal which is the sum of the above signal and the detected signal of the main light receiving portion A, i.e., A+2.0(B+C) is a signal in which alternating components are removed on the third interval D3 where pits are not formed on the main track T1 as shown in FIG. 7.

Therefore, when an information signal is detected by adding the detected signal of the main light receiving portion A which receives the center portion of the incident light beam and a signal produced by multiplying the detected signal of the auxiliary light receiving portions B and/or C which receive the side portions of the incident light beam by an appropriate operation constant K, an excellent information signal (an RF (radio frequency) signal) in which cross talk by adjacent tracks is remarkably reduced can be reproduced even when the recording medium 10 has a narrow track pitch.

Figure 8A:
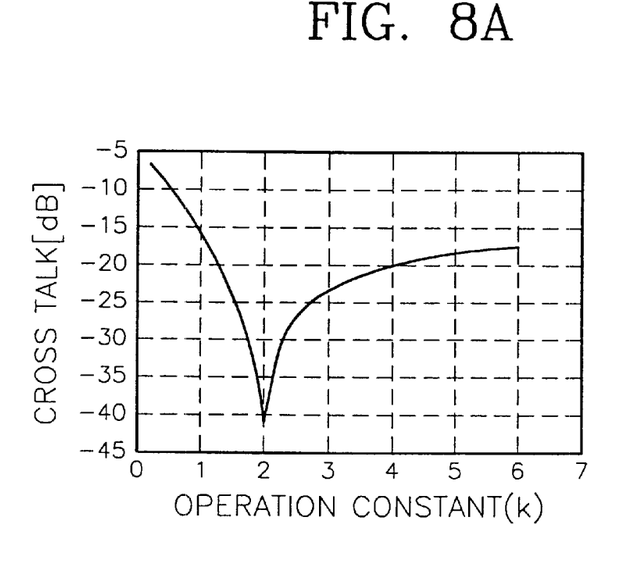
Figure 8B:
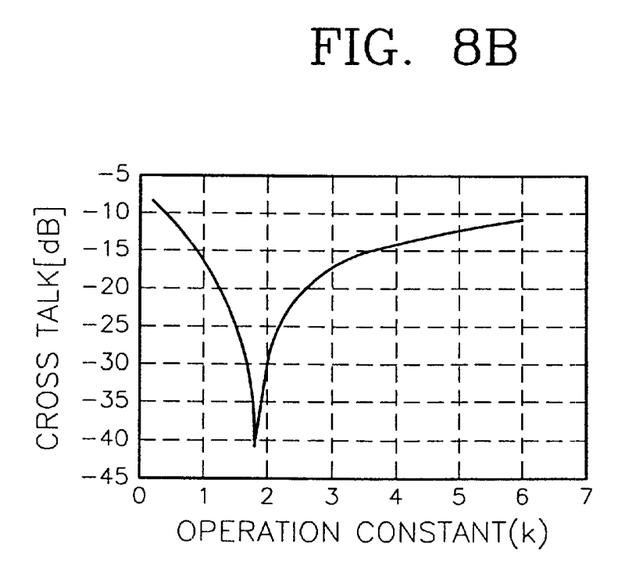

FIGS. 8A and 8B are graphs of the amounts of cross talk calculated according to operation constant K values respectively when the recording medium 10 having a track pitch of 0.368 μm and the track pattern shown in FIG. 6 is reproduced by an optical pickup apparatus according to the present invention under the condition in which the wavelength of the light source 11 is 410 nm and the numerical aperture of the objective lens 15 is 0.6.

FIG. 8A shows a graph of cross talk calculated according to operation constant K values when the main light receiving portion A is provided to receive ⅓ the center portion of the incident light, in which cross talk has the minimum value lower than −40 dB when the operation constant K=2.0.

FIG. 8B shows a graph of cross talk calculated according to operation constant K values when the main light receiving portion A is provided to receive ½ the center portion of the incident light, in which cross talk has the minimum value lower than −40 dB when the operation constant K=1.8.

As described above, the optimum value of the operation constant K can be decided in connection with the overall layout of an optical pickup apparatus, which permits cross talk to have a minimum value lower than −30 dB with respect to the main light receiving portion A having a size for receiving a predetermined percentage of the center portion of the incident light beam, i.e., a predetermined percentage of within the range of about 10 to 90%.

Therefore, when the main light receiving portion A of the photodetector 18 is provided so as to receive the center portion of the incident light in the range of about 10 to 90%, and an appropriate operation constant is decided corresponding to the size of the main light receiving portion A, an information signal (an RF signal) in which cross talk by adjacent tracks is reduced can be detected.

Accordingly, if an optical pickup apparatus according to the present invention is used, an excellent information signal having cross talk lower than −30 dB can be detected even when a HD-DVD in which the ratio of a track pitch to a beam spot is lower than 0.6 since a storage capacity higher than 15 GB is required.

In addition, since an optical pickup apparatus according to the present invention forms one beam spot, the intensity of the beam spot focused on the main track is stronger than a conventional optical pickup apparatus in which 3 beam spots are formed on the recording medium 10. Therefore, since an optical pickup apparatus according to the present invention can form a beam spot having a sufficient intensity on the main track, it can be used as a recording apparatus for recording an information signal on the recording medium 10.

Figure 9:
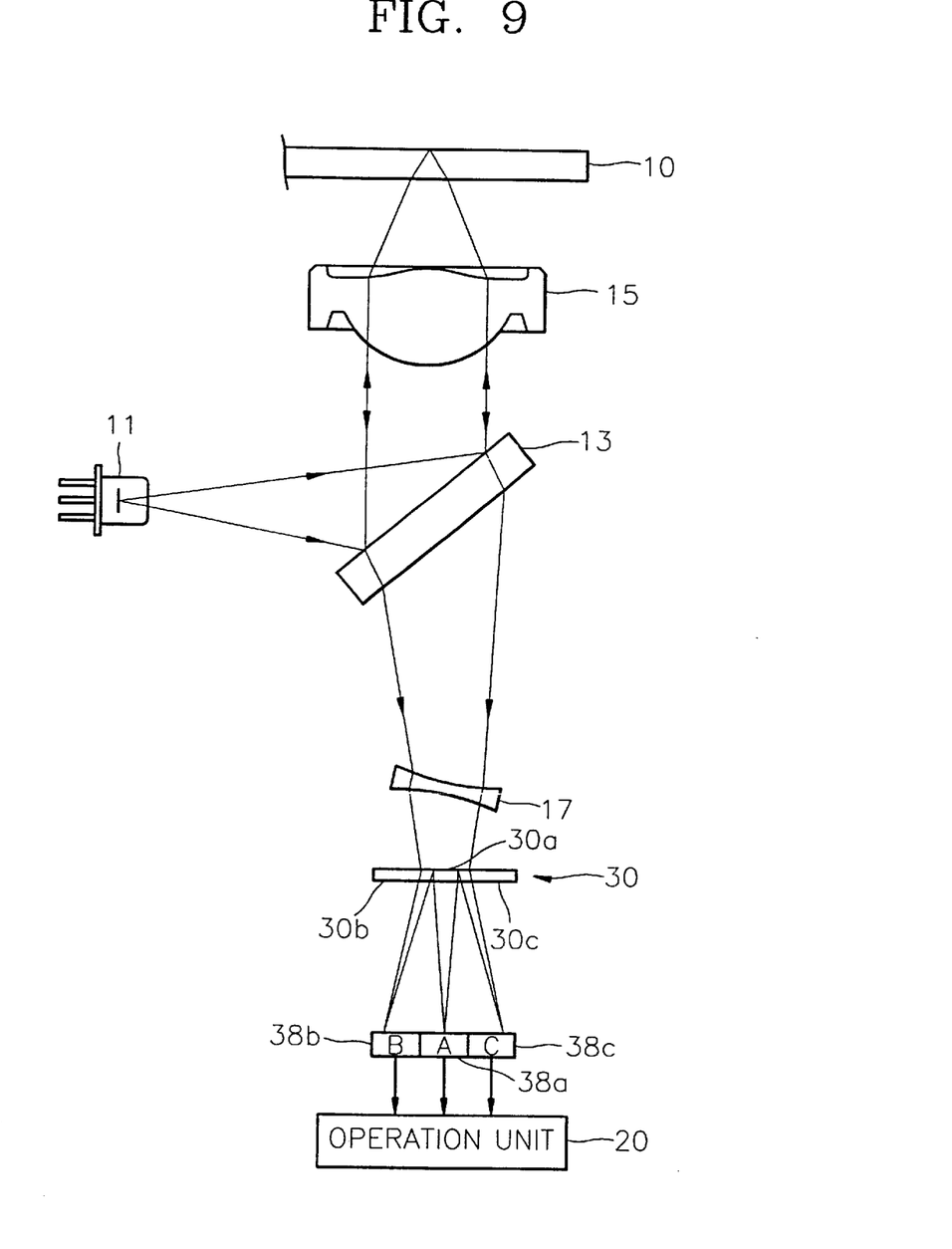
FIG. 9 is a diagram illustrating an optical layout of an optical pickup apparatus which reduces cross talk by adjacent tracks according to another embodiment of the present invention.

FIG. 9 shows a diagram schematically illustrating an optical layout of an optical pickup apparatus capable of reducing cross talk between adjacent tracks according to another embodiment of the present invention, in which the same reference numerals as in FIG. 4 indicate the same members. In this embodiment, a photodetecting means comprises an optical member 30 for directly passing the center portion of an incident light beam in a radial direction and for diffracting the side portions of the incident light beam at a predetermined angle, thereby separating the incident light beam into the center and side portions, and a plurality of photodetectors 38a, 38b and 38c for photoelectrically converting the separated light beams into electrical signals. Here, although the optical member 30 is shown to be disposed on the optical path between a sensing lens 17 and the photodetectors 38a, 38b and 38c, the optical member 30 can be disposed between a light path changer 13 and the sensing lens 17.

Figure 10:
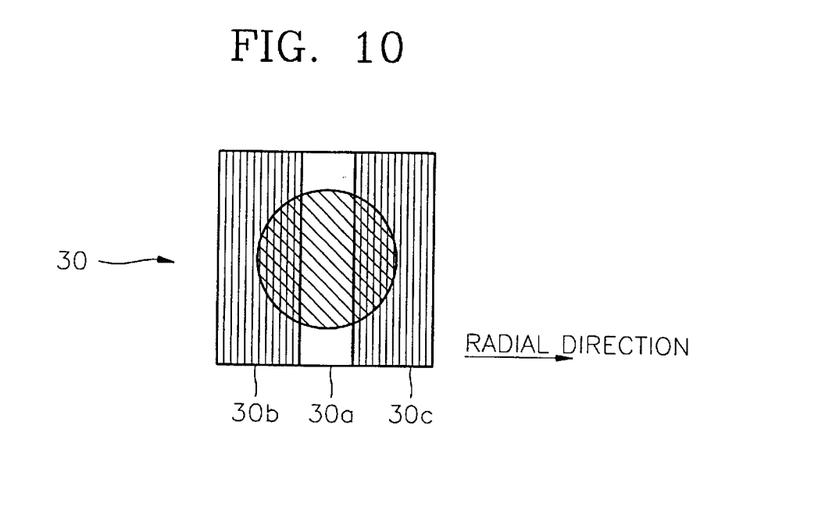
FIG. 10 is a plan view schematically illustrating an embodiment of the optical diffraction element shown in FIG. 9.

As shown in FIG. 10, the optical member 30 is composed of a light passing portion 30a for directly passing the center portion of the incident light beam in a radial direction, and pattern portions 30b and 30c for diffracting the side portions of the incident light beam at a predetermined angle. The light passing portion 30a may be a transparent member or an open aperture (not shown). In the pattern portions 30b and 30c, patterns, for example, hologram patterns are formed so that the patterns can diffract the incident light beam to produce a − first order diffracted light beam and a + first order diffracted light beam.

At this time, the light passing portion 30a has a size designed to directly pass about 10 to 90% of the center portion of the incident light beam as the main light receiving portion A of the previous embodiment of the present invention.

Figure 11:
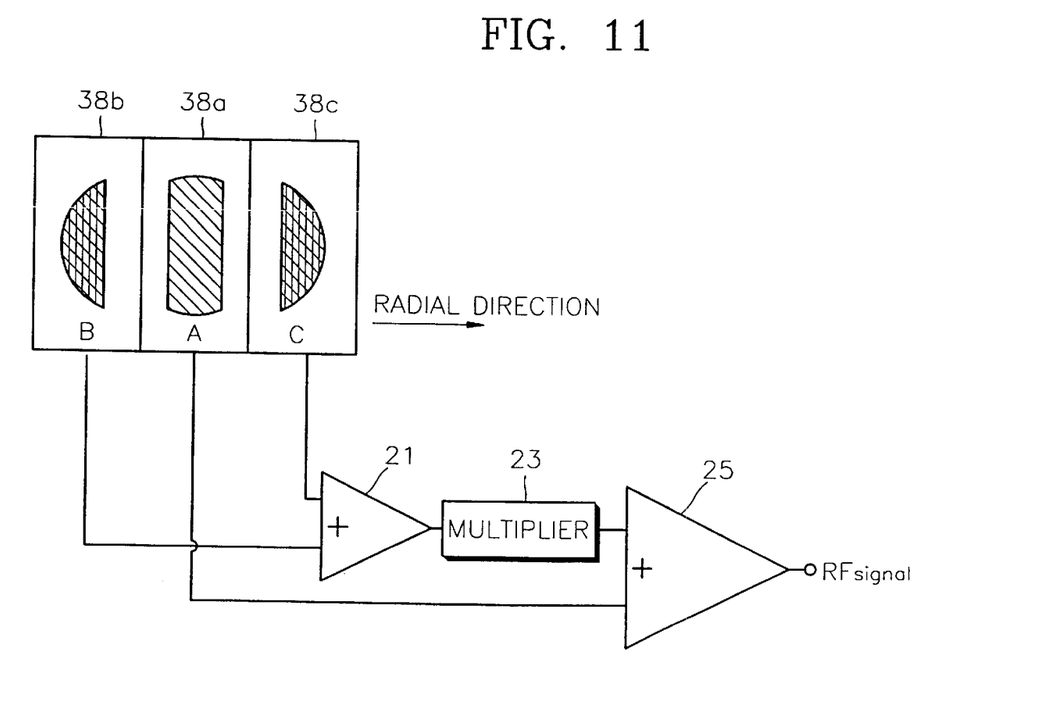
FIG. 11 is a block diagram schematically illustrating first, second and third photodetectors and an operation unit shown in FIG. 9.

As shown in FIG. 11, the main photodetector 38a receives the center portion of the light beam having passed the light passing portion 30a. The auxiliary photodetectors 38b and 38c are disposed at the sides of the main photodetector 38a in a radial direction of the recording medium 10, and receive the side portions of the light beam which have been diffracted at and passed by the pattern portions 30b and 30c, respectively.

Here, one of the pattern portions 30b and 30c may be composed of a shielding member (not shown). In this case, the auxiliary photodetector 38b or 38c is disposed corresponding to the pattern portions.

Since the principle and operation of reproducing an information signal in which cross talk by adjacent tracks is reduced by the above described optical pickup apparatus are the same as the previous embodiment of the present invention, the description will be omitted.

Here, it should be understood that various modifications and equivalents of an optical pickup apparatus according to the present invention may be made.

The above-described optical pickup apparatus according to the present invention illuminates one beam spot on the track of a recording medium, detects the center and side portions, with respect to a radial direction of the recording medium, of the light beam reflected from the recording medium, separately, multiplies the detected signal of the side portions by an operation constant, and adds the result and the detected signal of the center portion, thereby reproducing a main track information signal reduced in cross talk by adjacent tracks in real time.

Therefore, even when information of a high capacity recording medium having a narrow track pitch, in particular, a HD-DVD in which the ratio of a beam spot to a track pitch is decided to be a value less than 0.6 is reproduced, an excellent reproduced signal in which cross talk by adjacent tracks is reduced can be obtained in real time.

In addition, since the optical efficiency of a beam spot focused on the main track is not lowered, recording of an information signal is possible.

What is claimed is:

1. An optical pickup apparatus which reduces cross talk in an information signal caused by adjacent tracks of a recording medium, the optical pickup apparatus comprising:

a light source which emits a light beam;

an objective lens, disposed on an optical path between the light source and the recording medium, which converges the emitted light beam onto the recording medium;

a light path changer, disposed on an optical path between the light source and the objective lens, which changes a light path of the emitted light beam and changes a light path of a light beam reflected from the recording medium;

a detector which divides the reflected light beam into a center portion and at least one side portion corresponding to a radial direction of the recording medium and generates a first signal corresponding to the center portion and at least one other signal, each other signal corresponding respectively to one said side portion; and an operation unit which receives the first signal and at least one other signal, performs an operation on the at least one other signal, and combines the operated signal with the first signal to provide the information signal of a desired track having reduced cross talk caused by tracks adjacent to said desired track, said operation unit comprising:

a multiplier which multiplies the at least one other signal by an adjusting operation constant K; and an adder which adds the multiplied signal and the first signal to output a reduced cross talk information signal.

2. The optical pickup apparatus as claimed in claim 1, wherein the detector further comprises a photodetector having a main light receiving portion which receives the center portion of the reflected light beam, and at least one auxiliary light receiving portion which is disposed at a side of the main light receiving portion and which receives the at least one side portion of the reflected light beam apart from the main light receiving portion.

3. The optical pickup apparatus as claimed in claim 2, wherein the main light receiving portion has a predetermined size which receives about 10 to 90% of the reflected light beam.

4. The optical pickup apparatus as claimed in claim 1, wherein the detector comprises:

an optical member which directly passes the center portion of the reflected light beam and which diffracts the at least one side portion of the reflected light beam at a predetermined angle, thereby separating the reflected light beam into the center and the at least one side portions corresponding to the radial direction; and a plurality of photodetectors which photoelectrically convert the directly passed and diffracted portions of the reflected light beam into electrical signals independently of each other.

5. The optical pickup apparatus as claimed in claim 1, wherein the operation constant K has a value which is approximately 1 or greater than 1.

6. An optical pickup apparatus for an optical disk, comprising:

a light source which emits a first light beam;

an optical arrangement which transmits the first light beam from the light source to the optical disk as a focused spot and transmits light reflected from the optical disk as a second light beam, the second light beam including first, second and third beam segments reflected respectively from first, second and third areas along a radial line of the optical disk;

a detector which receives the second light beam and in response generates first, second and third electrical signals corresponding respectively to the first, second and third beam segments; and an operation unit which operates of the first, second and third electrical signals to provide an information signal with reduced cross talk, said operation unit comprising:

a first adder which adds the first and third signals to provide a summed signal;

a multiplier which multiplies the summed signal by a constant to provide a multiplied signal; and a second adder which adds the second signal and the multiplied summed signal to provide the information signal with reduced cross talk.

7. The optical pickup as claimed in claim 6, wherein the detector further comprises a photodetector having a plurality of independent segments, each segment generating one of the first, second and third electrical signals.

8. The optical pickup as claimed in claim 7, wherein the detector further comprises an optical element which splits the second light beam and diffracts the first and third beam segments at a predetermined angle with respect to the second beam segment.

9. The optical pickup as claimed in claim 6, wherein the first, second and third areas have respective centroids located at respectively increasing radii along the radial line.

10. A method of reducing crosstalk in a reproduction signal derived from a light beam reflected from an optical disk, the method comprising:

detecting a plurality of segments of the light beam and generating a plurality of electrical signals, a first of said plurality of electrical signals corresponding to light reflected from a first area positioned at a first radius along a radial line of the optical disk, each other electrical signal of said plurality of electrical signals corresponding to light reflected from a respective area positioned at a respective radius along the radial line, each said respective radius differing from the first radius; and multiplying each of said other electrical signals by a factor and summing said multiplied signals and said first electrical signal to provide the reproduction signal.

11. The method of reducing crosstalk as claimed in claim 10, wherein a first of said other electrical signals corresponds to a radius less than said first radius and a second of said other electrical signals corresponds to a radius greater than said first radius.

12. The method of reducing crosstalk as claimed in claim 10, wherein said factor is within a range including 1 and 2.

13. The method of reducing crosstalk as claimed in claim 10, wherein said first area corresponds to 10 to 90 percent of the area of said spot.

14. The method of reducing crosstalk as claimed in claim 10, further comprising optically offsetting said reflected light beam segments prior to detecting said reflected light beam segments.

15. An optical pickup apparatus which reduces cross talk in an information signal caused by adjacent tracks of a recording medium of an optical disk, the optical pickup apparatus comprising:

a light source which emits a first light beam;

an optical arrangement which transmits the first light beam from the light source to the optical disk as a focused spot and transmits light reflected from the optical disk as a second light beam, a detector which divides the reflected light beam into a center portion and a side portion and generates a first signal corresponding to the center portion and a second signal corresponding to the side portion, the center portion and side portion corresponding respectively to light reflected from first and second areas along a radial line of the optical disk; and an operation unit which receives the first and second signals, adjusts the amplitude of one of the first and second signals, and adds the adjusted signal with the other of the first and second signals to provide the information signal of a desired track having reduced cross talk caused by a track adjacent to said desired track.

* * * * *